(12) United States Patent
Prokoph

(10) Patent No.: US 6,985,973 B2
(45) Date of Patent: Jan. 10, 2006

(54) SYSTEM AND METHOD FOR TRANSMITTING DATA AND USING SYSTEM TIME INFORMATION FOR FIRST COMPUTER AND SECOND COMPUTER FOR MAKING TIME DRIFT CORRECTION

(75) Inventor: Hannes Karl Prokoph, Karlsruhe (DE)

(73) Assignee: RapidSolution Software AG, Karlsruhe (DE)

( * ) Notice: Subject to any disclaimer, the term of this patent is extended or adjusted under 35 U.S.C. 154(b) by 0 days.

(21) Appl. No.: 10/384,004

(22) Filed: Mar. 7, 2003

(65) Prior Publication Data

US 2004/0088428 A1    May 6, 2004

(30) Foreign Application Priority Data

Mar. 7, 2002  (DE)  ................................ 102 10 054

(51) Int. Cl.
    *G06F 13/00*    (2006.01)
    *G06F 15/16*    (2006.01)
    *H04N 7/10*    (2006.01)
    *H04N 7/173*    (2006.01)

(52) U.S. Cl. .......................... 710/33; 710/29; 710/31; 709/227; 709/232; 725/74; 725/87; 725/98; 725/101; 725/145

(58) Field of Classification Search ................. 710/31, 710/33, 29; 709/227, 232; 725/145, 74, 725/87, 98, 101
See application file for complete search history.

(56) References Cited

U.S. PATENT DOCUMENTS

| | | | |
|---|---|---|---|
| 6,018,359 A * | 1/2000 | Kermode et al. ............ 725/101 |
| 6,637,031 B1 * | 10/2003 | Chou ........................... 725/87 |
| 6,728,956 B2 * | 4/2004 | Ono ............................ 717/168 |
| 2001/0015962 A1 * | 8/2001 | Iwakuni et al. ............. 370/270 |
| 2003/0084461 A1 * | 5/2003 | Hoang ........................ 725/145 |

FOREIGN PATENT DOCUMENTS

DE 19639384 A1 5/1998

* cited by examiner

*Primary Examiner*—Tammara Peyton
(74) *Attorney, Agent, or Firm*—Collard & Roe, P.C.

(57) ABSTRACT

A method for further processing data recorded on a computer arranged in a computer network. A quantity of data is recorded on the computer and stored in a memory. A quantity of supplementary data describing a property of the quantity of is generated centrally or peripherally in real time and stored. This quantity of supplementary data is used to specifically access or extract a selected quantity of the quantity of data recorded and stored.

17 Claims, 2 Drawing Sheets

SYSTEM AND METHOD FOR TRANSMITTING DATA AND USING SYSTEM TIME INFORMATION FOR FIRST COMPUTER AND SECOND COMPUTER FOR MAKING TIME DRIFT CORRECTION

CROSS REFERENCE TO RELATED APPLICATIONS

Applicant claims priority under 35 U.S.C. §119 of GERMAN Application No. DE 102 10 054.3 filed on Mar. 7, 2002.

BACKGROUND OF THE INVENTION

1. Field of the Invention

The invention relates to a method for further processing data in a computer network, which are preferably recorded and stored using computers arranged in the computer network in distributed fashion.

2. Prior Art

In connection with the rapid drop in the price of storage media which has taken place in recent years, particularly in the realm of electronic media, and secondly in connection with the ever decreasing space requirement for these storage media, it has become possible for private individuals, also, to store forms and volumes of data which were previously barely manageable merely on account of their scope. Just as an example, the recording of audio and video data will be mentioned at this point, which private individuals were previously barely able to record in digital form on account of the considerable volume of data. Thus, by way of example, any audio receiver, such as a radio, television or the "TV card" in a computer, can be understood to be the computer's audio/video input which can be used to digitize and finally to store an audio signal in coded form as a digital audio stream on this computer's hard disk. In this context, these data can be acquired via satellite or else via terrestrial radio transmissions. To this end, it is merely necessary to connect the aforementioned receivers to the computer and to digitize the initially analog data.

The enormous need for electronic audio/video recordings has increased further as a result of the latest technical developments. However, it is increasingly being found to be a problem that although the data in question can be received and stored without any problem, both further processing and navigation in these data have become much more difficult on account of the considerable scope of these data. Furthermore, volumes of data with such a scope can also continue to be transported and interchanged only with considerable time involvement.

SUMMARY OF INVENTION

Against the background of the prior art described above, the invention is based on the object of providing a method which can be used for better management, further processing and interchange of the aforementioned volumes of data.

The object on which the invention is based is achieved by a method disclosed herein. Advantageous refinements of the invention are also disclosed.

The fact that, in addition to the data stored in a computer network, supplementary data representing or permitting a description of properties of the recorded data are centrally or peripherally generated and stored means that specific access and hence extraction of the particular data defined by these supplementary data are possible. The centrally or peripherally created supplementary data thus facilitate specific access to selected data. If the invention is understood correctly, it is therefore possible for interchange of the data as such to be replaced by interchange of the supplementary data, since the information which is inherent in these supplementary data can be used for specifically selecting the data specified by this supplementary information from the volume of recorded data in order to route them to further processing, for example.

In one very simple embodiment, the supplementary data are the start of transmission and the end of transmission of a volume of data defined as a transmission. The supplementary data can thus be "playlists", which are essentially nothing other than a program of transmissions. Assuming that an audio or video stream is transmitted in real time, the time of transmission is a discrete specification for each data item. Each data item has an individual transmission time. The transmission time is thus a unique definition of each data item. In theory, the precise denotation of the time of transmission can be used to access any individual data item in an audio or video stream or any other volume of data. The information about the time of transmission is thus an explicit parameter for denoting the recorded data.

In this context, the supplementary data can be generated manually or can be generated at the time a transmission is recorded, for example by starting a concurrent system clock or by evaluating the received data or on the basis of other data. These supplementary data can be generated automatically either by reading information about the respective time of transmission, which information is also delivered by the transmitter, or else by virtue of the received data being evaluated as such, like the evaluation of an RDS signal or of the received picture information, for example, as is known from the "Snow White system" for masking out advertising pop-ups.

Once the supplementary data have been generated or obtained in the manner cited, these supplementary data can then be interchanged in the computer network for the purpose of further processing, denotation, marking or extraction of the recorded data. To simplify access, the supplementary data can be stored on a central server which the users of the inventive system are then able to access. In this case, the supplementary data stored on the central server might also be maintained by the users themselves if they have generated them.

If the recorded data are defined over the time at which they are transmitted or recorded, it should be remembered that it is not necessarily possible to assume a uniform system time in computer networks. The objective time of transmission of a volume of data can therefore differ from the transmission time stored on the recording computer. In one advantageous embodiment, the invention therefore involves the system times being compared between the computer delivering the supplementary data, possibly the central server, and the computer acquiring the supplementary data, possibly a user's computer, and in so doing any time drift being established. This information is then used to perform drift correction. Since manipulation of the system times ought not to be permitted in most cases for security reasons, the time drift established is used to make a user-specific correction to the supplementary data.

For these supplementary data, it is also possible to store "special data" which denote characteristic properties of particular data and thereby mark the start or the end of a transmission, for example.

By evaluating these special data, the volume of data individualized in this manner can then be accessed specifically, in exactly the same way as when using the previously explained transmission times, and as soon as the data have been stored at a central location with the supplementary data which comprise the special data, the data individualized by the special data can easily be accessed by transmitting the supplementary data.

However, as for the transmission time explained previously, the special data also have the problem of a possible time drift between the data recorded at various locations. This time drift can be ascertained by virtue of the time information associated with the data which are defined by the special data being evaluated with respect to a possible time drift, and the supplementary data being corrected by this time drift. In this case, it is sufficient to conduct a "local-area search" in the region around the special data, because the time drift usually comprises only a few seconds.

The data's characteristic properties analyzed for creating the special data differ depending on the respective data which are to be recorded. By way of example, a distinction is drawn between audio data and video data.

If the invention is understood correctly, application of the invention is naturally not limited to acquiring data distributed in the computer network, preferably on the Internet. Instead, all the data, preferably audio and/or video data, preferably distributed in a broadcasting method, can be routed to appropriate further processing by the inventive system. In this case, by way of example, conventional receivers, such as radio or television sets or the TV or sound card in a computer, can be used as reception devices, the data acquired can be digitized and can preferably be stored as an audio or video stream on the respective hard disk or on another storage medium in the computer.

In yet another advantageous embodiment of the invention, the invention can involve not just specific extraction of particular data but also compilation and combination of extracted data, for example. By way of example, samplers of transmissions or transmission parts can be generated in this manner, or interruptions in transmission can subsequently be removed.

Navigation in this volume of data is then effected using the supplementary data.

In one advantageous embodiment of the invention, besides the transmitted information, such as the transmission times, other information about the supplementary data, which information describes the data, can be stored and acquired by the users. This is to be understood, by way of example, to mean a footprint of the respective transmissions which briefly defines their content or particular transmission parts.

Since the invention involves straightforward access to the data acquired being made possible, the user of the system is in the advantageous situation of initially acquiring data uninterrupted over long periods of time without any interruption or presetting. It is thus possible to record radio or television transmissions for a whole week, for example.

In one variant of the invention, the "playlists" which are produced within the context of the invention and may be held in reserve at a central location can also be used for recording particular volumes of data, preferably under time control. In this case, the supplementary data are thus evaluated before the data are recorded.

To be able to store such volumes of data appropriately, the invention allows first coding and finally compression of the received data to be carried out by the users before storage.

In the case of compressed or coded recording of the data, it has turned out to be useful if the recorded data's characteristic properties denoted in the form of the special data can also be identified in the compressed or coded version. The local-area search can then be conducted in the data stored in compressed or coded form in a much shorter time.

In one advantageous embodiment, the supplementary data or just the special data can be created for the recorded data on a second data track.

The local-area search is then conducted on the aforementioned second track.

In one alternative embodiment of the invention, to ascertain the special data, it is also possible to decompress or to decode the recorded data in order subsequently to ascertain the characteristics required for determining the special data from the appropriately processed volume of data. However, it is then necessary to decompress or to decode the recorded data before the local-area search in order to ascertain any time drift.

If understanding is correct, the supplementary data can be generated automatically, can be delivered by a content provider, such as a television or radio station, or can be generated and transmitted by the users and can then be maintained in a central memory on a central server. For the purpose of creating such a "playlist", it is thus conceivable, by way of example, for an exchange market to allow other "playlists" to be acquired in exchange. These supplementary data can be used for specifically extracting individual transmissions or transmission parts. The breakdown, ascertained by the supplementary data, of the total volume of data acquired makes it possible to select, following the acquisition of unassigned, unencrypted data, for example music, within the context of the supplementary data, particular pieces of music and hence to produce, by way of example, a request CD legally in digital quality.

BRIEF DESCRIPTION OF THE DRAWINGS

The invention is explained in more detail below with reference to an exemplary embodiment. In the drawings.

DETAILED DESCRIPTION OF THE INVENTION

Figure 1:
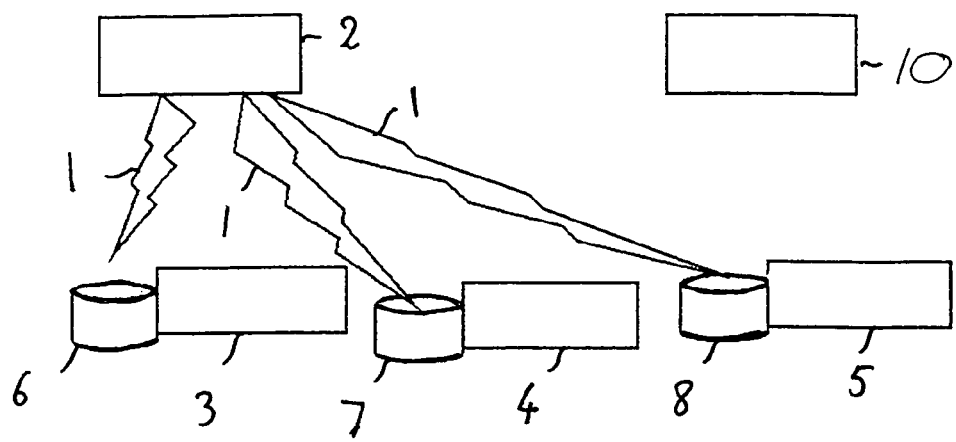
FIG. 1 shows a basic diagram relating to the recording of data broadcast in the broadcasting method.

The exemplary embodiment shown in FIG. 1 relates to the recording of data 1 broadcast in a broadcasting method.

In this case, the data 1 are distributed to a multiplicity of users 3–5 terrestrially by a transmitting station 2 via cables or using other radio broadcast methods. In the present example, the transmitting station 2 is a radio station which distributes audio data, for example music data, to a multiplicity of users 3–5 terrestrially, that is to say in analog form. The users 3–5 receive the data 1 broadcast by the central transmitting station 2 in an appropriate audio receiver, for example a tuner. The tuners are respectively connected to the sound card in a computer 6–8. The data 2 respectively acquired via the sound card in each computer 6–8 are digitized and can be stored as an audio stream on the storage media, for example on the hard disks 6–8 of the computers 6–8 associated with the users 3–5.

It goes without saying that, instead of the radio station, a television station could also transmit video data to the users 3–8 in analog form, the users then receiving the acquired video data via a TV card and storing them in analog form in the storage elements 6–8.

Within the context of the invention, it is naturally also possible for data 1 broadcast directly to a user 3–5 in a unicast or monocast to be routed to further processing.

The exemplary embodiment in this case will stay with the example of the radio station, however. The computer users 3–5, who represent any quantity of users, are connected to one another by means of a computer network, for example an intranet or the Internet. This computer network includes a central server 10. The central server 10 thus has a respective data link to the users 3–5.

In the present example, the whole radio program, for example for a week, can thus be stored in distributed form on the storage media 6–8 associated with the users 3–5.

Figure 2:
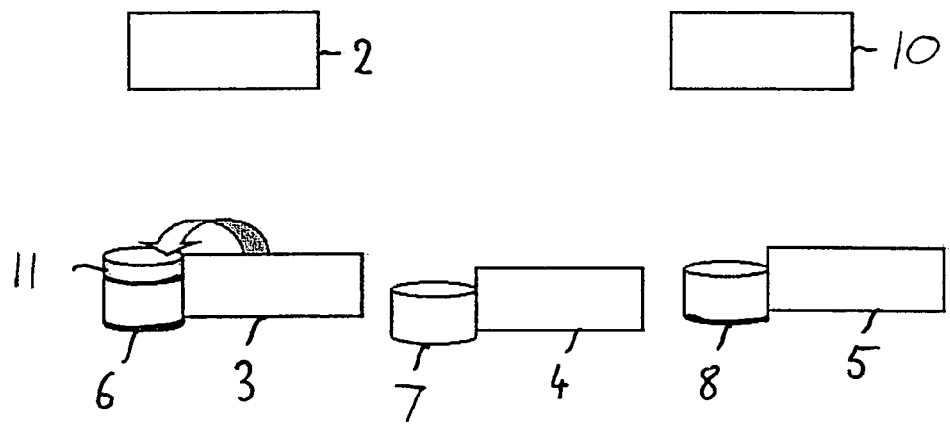
FIG. 2 shows a basic diagram relating to the generation of supplementary data for the recorded data.

In another step, shown in FIG. 2, one or more users 3–5 create supplementary data 11. In the present example, only user 3 generates supplementary data 11. These can be, by way of example, the data for a particular piece of music 12 or 13 which has been broadcast in said transmission period. The user 3 stores, as supplementary data 11, the time of transmission of this piece of music 12 or 13, that is to say at least the start of transmission and the end of transmission of the piece of music 12 or 13 in question and also the name of the piece of music 12 or 13 and the name of the interpreter as supplementary data 11 on a storage medium 6. In a similar manner, other users 4 or 5 can also generate the same or other supplementary data 11 in connection with or independently of their recordings.

Figure 3:
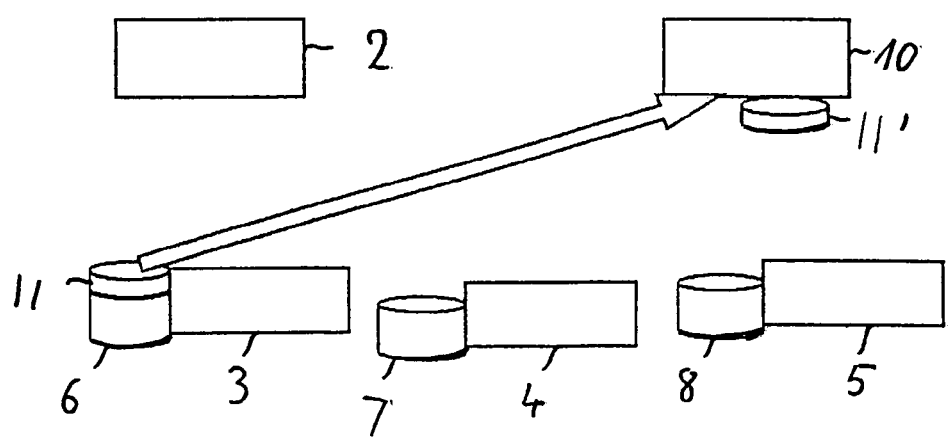
FIG. 3 shows a basic diagram relating to the transmission of the supplementary data to a central server.

In line with FIG. 3, these supplementary data 11 can then be transmitted to the central server 10. In this case, it is important for further understanding that the user 3 transmits only the supplementary data, and not the recorded data 1, for example. As soon as the data link between the user 3 and the central server 10 has been set up for transmitted supplementary data 11, time alignment is performed between the computer associated with the user 3 and the computer associated with the central server 10. If a time difference is established between the system time for the user 3 and for the central server 11 in this case, the supplementary data transmitted to the central server 10 are corrected using this time drift.

Figure 4:
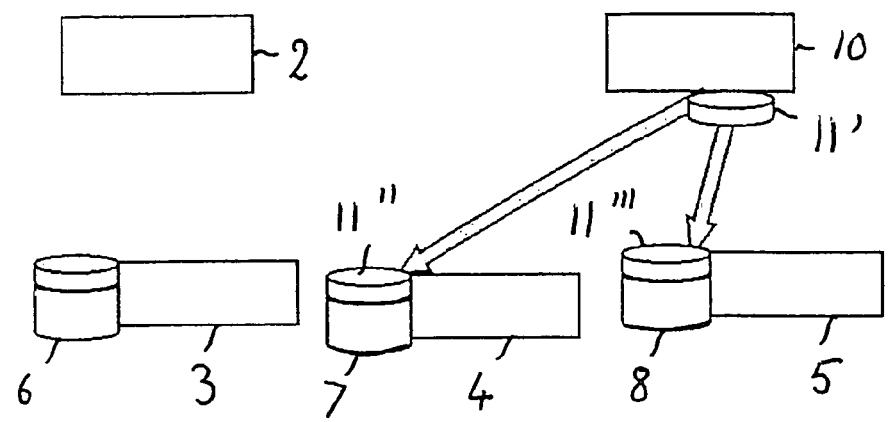
FIG. 4 shows a basic diagram relating to the further distribution of the supplementary data.

In line with FIG. 4, there is thus also a copy 11' of the supplementary data 11 on the central server 10. In line with FIG. 4, these supplementary data 11' can now also be made accessible to the other users 4 and 5 via the computer network, in the present example the Internet. To this end, the users 4 and 5 connect to the central server 10, for example by dialing up an Internet portal. Setup of this connection between the users 4 and 5 and the central server 10 also involves ascertainment of any individual time drift between the system times for the users 4 and 5 and the system time on the central server 10. The supplementary data 11" or 11'" to be transmitted to the further users 4 or 5 are then corrected on a user-specific basis as a result. In one alternative embodiment, the system time for the users 4 and 5 could also be synchronized with the system time on the central server 10.

The result is that all the users 3, 4, 5 now have access to the information, inherent in the supplementary data 11, about the pieces of music 12 or 13 processed by user 3. This information can now be used to extract the pieces of music 12 or 13 described by the user 3 from the volume of data recorded in the storage elements 7 and 8. In this case, the pieces of music 12 or 13 denoted by the supplementary data 11", 11'" can be extracted automatically, since the pieces of music 12 or 13 can be explicitly defined by these supplementary data and can be extracted by the computer in a manner which is known per se.

Figure 5:
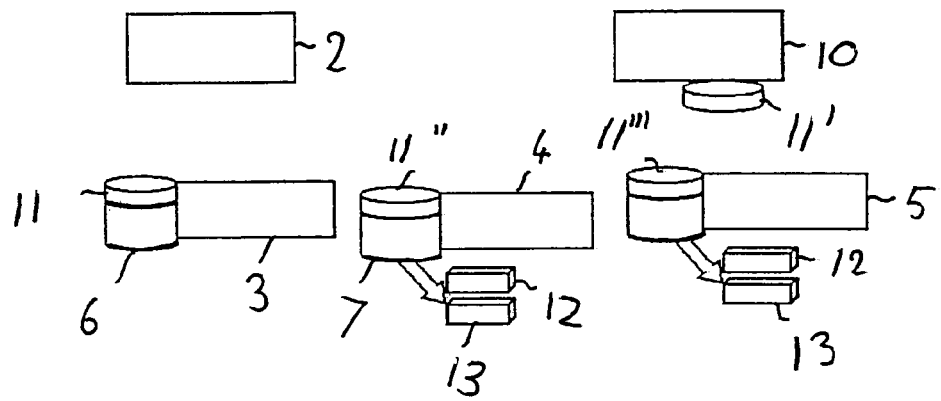
FIG. 5 shows a basic diagram relating to the further processing of the stored data using the supplementary data.

In line with FIG. 5, the supplementary data 11" and 11'" acquired from the central server 10 can thus be used by the respective user 4 or 5 to extract the pieces of music 12 or 13. If the users 4 or 5 are interested only in these pieces of music, the rest of the recording can then be erased. The respective users 3–5 can use the supplementary data to navigate in the appropriately broken down, recorded data 1 and possibly to compile, extract or transmit said data again without difficulty. To swap the pieces of music 12 or 13, the users 3 and 5 do not need to interchange the audio data for the pieces of music 12 or 13, but rather only need to interchange the supplementary data 11 describing these pieces of music. Alternatively, the data can naturally also be acquired centrally via the central server 10. Ideally, the users 3–5 then find all the necessary supplementary data 11 or 11' on the central server 10. Alternatively, the supplementary data held in reserve on the central server 10 can be maintained by the respective users 3–5 as required, can be automatically generated when the transmissions are broadcast, for example by evaluating a radio transmission's RDS signal, or can be maintained manually by the operator of the central server 10, however. Often, the supplementary data required are provided by the radio stations or television stations or by other content providers themselves. Alternatively, these supplementary data can also be obtained from "playlists" produced by users 3–5.

The text above thus describes a powerful method for further processing and refining data recorded in a computer network.

What is claimed is:

1. A method for further processing data recorded on a computer arranged in a computer network and stored using a memory, the method comprising the steps of:
   a) recording a quantity of data on the computer arranged in the computer network;
   b) storing said quantity of data using a memory;
   c) generating a quantity of supplementary data in real time, wherein said quantity of supplementary data comprises a description of a property of said quantity of data;
   d) transmitting said quantity of supplementary data from a first computer in the computer network to a second computer in the computer network;
   e) transmitting a time information relating to a system time on said first computer along with said quantity of supplementary data;
   f) storing said quantity of supplementary data on at least one computer in the computer network;
   g) using said time information to ascertain a time drift with respect to said second computer;
   h) making a drift correction for said quantity of supplementary data; and
   i) using said quantity of supplementary data to specifically access or extract a selected quantity of data from said quantity of data.

2. The method according to claim 1, wherein said quantity of data comprises a transmission and said quantity of supplementary data comprises a start of said transmission and an end of said transmission.

3. The method according to claim 2, further comprising the steps of:
   a) manually maintaining said quantity of supplementary data;
   b) automatically generating said quantity of supplementary data by evaluating said transmission at a time said transmission is recorded;
   c) having a content provider deliver said quantity of supplementary data; and
   d) having a user transmit said quantity of supplementary data.

4. The method according to claim 1, further comprising the step of connecting the computer arranged in the computer network to a receiver for receiving said quantity of data which is broadcast by a broadcast method, wherein the computer comprises a storage medium for recording said quantity of data.

5. The method according to claim 1, further comprising the step of combining said quantity of selected data extracted using said quantity of supplementary data to form a new data record comprising a sampler of transmissions or transmission parts.

6. The method according to claim 1, further comprising the step of using said quantity of supplementary data for navigating said quantity of data recorded.

7. The method according to claim 1, further comprising the step of using said quantity of supplementary data for recording further information for identifying said selected quantity of data in a form of a footprint of a transmission or part of a transmission.

8. The method according to claim 1, further comprising the steps of using said quantity of supplementary data for recording data under time control and transmitting said quantity of supplementary data on call from a computer in the computer network.

9. A method for further processing data recorded on a computer arranged in a computer network and stored using a memory, the method comprising the steps of:
   a) recording a quantity of data on the computer arranged in the computer network;
   b) storing said quantity of data using a memory;
   c) evaluating said quantity of data;
   d) ascertaining a quantity of special data individualizing some or all of said quantity of data as a result of said evaluating of said quantity of data;
   e) generating a quantity of supplementary data in real time, wherein said quantity of supplementary data comprises a description of a property of said quantity of data;
   f) transmitting said quantity of supplementary data from a first computer in the computer network to a second computer in the computer network;
   g) transmitting said quantity of special data in connection with said quantity of supplementary data to a computer in the computer network;
   h) including in said quantity of special data an associated time information denoting a respective transmission time;
   i) storing said quantity of supplementary data on at least one computer in the computer network;
   j) storing said quantity of special data in connection with said quantity of supplementary data on at least one computer in the computer network;
   k) ascertaining a time drift between said first computer transmitting said quantity of supplementary data and said second computer receiving said quantity of supplementary data by using said respective transmission time, such that a local-area search of a quantity of data recorded by said second computer includes said quantity of special data and said respective transmission time;
   l) taking said time drift into account when accessing said quantity of special data and using said time drift to correct said quantity of supplementary data before said quantity of supplementary data is transferred; and
   m) using said quantity of supplementary data to specifically access or extract a selected quantity of data from said quantity of data.

10. The method according to claim 9 further comprising the step of using said quantity of special data to specifically access or extract a selected quantity of data from said quantity of data.

11. The method according to claim 9, wherein said quantity of special data comprises a characteristic soundtrack when said quantity of data comprises a quantity of audio data and wherein said quantity of special data comprises a characteristic picture signal when said quantity of data comprises a quantity of video data.

12. The method according to claim 9, further comprising the step of recording said quantity of data in a coded or compressed form.

13. The method according to claim 12, further comprising the step of identifying a characteristic signal of said quantity of data denoted by said quantity of special data within said coded or compressed form of said quantity of data.

14. The method according to claim 13, further comprising the steps of:
   a) creating a second track for storing said quantity of special data; and
   b) ascertaining said quantity of supplementary data from a time information for said second track and from said quantity of special data.

15. The method according to claim 14, further comprising the step of performing a local-area search of said second track.

16. The method according to claim 12, further comprising the steps of:
   a) decompressing or decoding a quantity of data denoted by said quantity of special data;
   b) identifying a characteristic signal from said decompressed or decoded quantity of data;
   c) storing said characteristic signal as a quantity of special data; and
   d) decompressing or decoding a local area of the computer and then performing a local-area search.

17. The method according to claim 1, further comprising the steps of:
   a) providing a central server comprising a central memory for storing said quantity of supplementary data;
   b) generating said quantity of supplementary data automatically when said quantity of data is recorded by evaluating said quantity of data;
   c) delivering said quantity of supplementary data from a content provider before, during or after a transmission of said quantity of data; and
   d) maintaining said quantity of supplementary data in said central memory.

* * * * *